United States Patent
Vachhani et al.

(10) Patent No.: US 10,438,133 B2
(45) Date of Patent: Oct. 8, 2019

(54) SPEND DATA ENRICHMENT AND CLASSIFICATION

(71) Applicant: Global eProcure, Clark, NJ (US)

(72) Inventors: Vishal Vachhani, Navi Mumbai (IN); Prashant Jha, Navi Mumbai (IN); Amol Farkade, Navi Mumbai (IN)

(*) Notice: Subject to any disclaimer, the term of this patent is extended or adjusted under 35 U.S.C. 154(b) by 558 days.

(21) Appl. No.: 15/238,871

(22) Filed: Aug. 17, 2016

(65) Prior Publication Data

US 2018/0053115 A1 Feb. 22, 2018

(51) Int. Cl.
- *G06F 15/18* (2006.01)
- *G06N 20/00* (2019.01)
- *G06Q 30/00* (2012.01)
- *G06N 5/02* (2006.01)

(52) U.S. Cl.
CPC ............ *G06N 20/00* (2019.01); *G06Q 30/00* (2013.01); *G06N 5/022* (2013.01)

(58) Field of Classification Search
CPC ........ G06N 20/00; G06N 5/022; G06N 7/005; G06N 99/00; G06F 16/185; G06F 16/21; G06F 16/215; G06F 16/22; G06F 16/2228; G06F 16/23; G06F 16/2379; G06F 16/24575; G06F 16/254; G06F 16/283; G06Q 10/06; G06Q 10/0637; G06Q 10/087; G06Q 10/10; G06Q 30/0633; G06Q 30/0635; G06Q 40/06; G06Q 40/12; G06Q 10/107; G06Q 30/00; G06Q 30/0261; G06Q 30/0267

See application file for complete search history.

(56) References Cited

U.S. PATENT DOCUMENTS

| | | | | |
|---|---|---|---|---|
| 8,010,466 B2 * | 8/2011 | Patinkin | ................... | H04L 51/12 706/12 |
| 8,239,335 B2 * | 8/2012 | Schmidtler | ............. | G06N 20/00 706/20 |
| 9,665,628 B1 * | 5/2017 | Dubey | ................... | G06F 16/215 |
| 2009/0204610 A1 * | 8/2009 | Hellstrom | ................ | G06F 16/00 |
| 2014/0372346 A1 * | 12/2014 | Phillipps | ................ | G06N 20/00 706/12 |

* cited by examiner

*Primary Examiner* — Robert G Bachner
(74) *Attorney, Agent, or Firm* — David M. Breiner; BrownWinick Law Firm

(57) ABSTRACT

The present invention discloses a method, a system and a computer program product for spend data classification using selected taxonomies. The invention provides refresh classification tool and implementation classification tools for spend data classification. The invention further provides a web mining tool for determining unknown terms in spend data to obtain an enriched spend data for classification.

28 Claims, 8 Drawing Sheets

310

| Supplier Name | Transactional Information | Category |
|---|---|---|
| COMPANY1 PVT LTD | TRAIN AND FLIGHT TICKETS | OTHER TRAVELS AND ENTERTAINMENT |
| COMPANY1 PRIVATE LTD | FLIGHT SERVICES | OTHER TRAVELS AND ENTERTAINMENT |
| COMPANY2 | NOT AVAILABLE | FREIGHT FORWARDING |
| COMPANY3 LLC | INDUSTRIAL TRAINING/SERVICES | TRAINING AND DEVELOPMENT |

| Supplier Name | Transactional Information | Category |
|---|---|---|
| COMPANY1 PVT LTD | TRAIN AND FLIGHT TICKETS | OTHER TRAVELS AND ENTERTAINMENT |
| COMPANY1 PRIVATE LTD | FLIGHT SERVICES | OTHER TRAVELS AND ENTERTAINMENT |
| COMPANY2 | TICKETS, FLIGHT | FREIGHT FORWARDING |
| COMPANY3 LLC | INDUSTRIAL TRAINING/SERVICES | TRAINING AND DEVELOPMENT |

| Category | Code |
|---|---|
| OTHER TRAVELS AND ENTERTAINMENT | C1 |
| FREIGHT FORWARDING | C2 |
| TRAINING AND DEVELOPMENT | C3 |

| Normalized Supplier Information | Category Code Vector |
|---|---|
| COMPANY1 TRAIN FLIGHT TICKETS | C1 |
| COMPANY1 FLIGHT SERVICES | C1 |
| COMPANY2 TICKETS FLIGHT | C2 |
| COMPANY3 INDUSTRIAL TRAINING SERVICES | C3 |

FIG. 3D

| Transaction/Variables | COMPANY1 | TRAIN | FLIGHT | TICKETS | COMPANY2 | COMPANY3 | INDUSTRIAL | SERVICES | TRAINING |
|---|---|---|---|---|---|---|---|---|---|
| 1 | 1/4 | 1/4 | 1/4 | 1/4 | 0 | 0 | 0 | 0 | 0 |
| 2 | 1/3 | 0 | 1/3 | 0 | 0 | 0 | 0 | 1/4 | 0 |
| 3 | 0 | 0 | 1/3 | 1/3 | 1/3 | 0 | 0 | 0 | 0 |
| 4 | 0 | 0 | 0 | 0 | 0 | 1/4 | 1/4 | 1/4 | 1/4 |

| COMPANY1 | TRAIN | FLIGHT | TICKETS | COMPANY2 | COMPANY3 | INDUSTRIAL | SERVICES | TRAINING |
|---|---|---|---|---|---|---|---|---|
| 0.69315 | 1.38629 | 0.28768 | 0.69315 | 1.38629 | 1.38629 | 0.69315 | 0.69315 | 1.38629 |

| Transaction/Variables | COMPANY1 | TRAIN | FLIGHT | TICKETS | COMPANY2 | COMPANY3 | INDUSTRIAL | SERVICES | TRAINING |
|---|---|---|---|---|---|---|---|---|---|
| 1 | 0.69315 | 1.38629 | 0.28768 | 0.69315 | 0.00000 | 0.00000 | 0.00000 | 0.00000 | 0.00000 |
| 2 | 0.69315 | 0.00000 | 0.28768 | 0.00000 | 0.00000 | 0.00000 | 0.00000 | 0.69315 | 0.00000 |
| 3 | 0.00000 | 0.00000 | 0.28768 | 0.69315 | 1.38629 | 0.00000 | 0.00000 | 0.00000 | 0.00000 |
| 4 | 0.00000 | 0.00000 | 0.00000 | 0.00000 | 0.00000 | 1.38629 | 1.38629 | 0.69315 | 1.38629 |

| Category Code | Preferred model |
|---|---|
| C1 | Naïve Bayes |
| C2 | Support Vector Machine |
| C3 | Logistic regression |
| C4 | Support Vector Machine |
| C5 | Naïve Bayes |

| S.No | Normalized Supplier Information | Naïve Base | SVM | Logistic Regression |
|---|---|---|---|---|
| 1 | COMPANY1 TRAIN AND FLIGHT TICKETS | C1 | C1 | C1 |
| 2 | COMPANY1 FLIGHT SERVICES | C1 | C1 | C2 |
| 3 | COMPANY2 TICKETS FLIGHT | C3 | C2 | C2 |
| 4 | COMPANY3 INDUSTRIAL TRAINING SERVICES | C1 | C2 | C3 |

SPEND DATA ENRICHMENT AND CLASSIFICATION

BACKGROUND

1. Technical Field

The present invention relates generally to data enrichment and classification. More particularly, the invention relates to systems, methods and computer program products for enrichment and classification of spend data into a set of selected taxonomies.

2. Description of the Prior Art

In any organization, procurement spend plays a very significant role in analyzing its expenditures, savings and profits. Further, the analysis of spend data can help in taking measures for reducing expenditures, maximizing savings, making key business decisions etc. To get the visibility from spend data, it is very important to identify the category in which it belongs. In most organizations, goods and services are procured from various service providers and it becomes tedious to get insights from the spend data. Identifying the categories, in which a transaction belongs to, can help in making key decisions related to business.

Various challenges are faced in classification of spend data due to the characteristic of such data. For example, spend data is large in volume and the spend transactions have very little information about the services procured from a vendor/service provider. Furthermore, transaction records often have an absence of, or very little information regarding, vendor name, invoice description, purchase order description, material description, and general ledger account information. Furthermore, the records associated with redundant transactions in data and inconsistencies in data occurring at the time of data entry may be absent or unclear. Also, in spend data, even though the vendor name and description columns are text fields they are very short and contain very limited information making them difficult to be directly utilized. Hence, this classification problem has more challenges than normal text classification problems.

In case a supplier information from a spend data or any entity information from a transaction/spend data is unavailable due to some error, the entire information has to be removed or made redundant for the purpose of classification. Any data classification done on basis of such incomplete information does not provide accurate results.

There are prevailing arts on data classification such as US 8239335 titled "Data classification using machine learning techniques". However, none of the existing prior art provide classification of spend data with high accuracy. Also, the existing art does not provide a solution in case there is lack of information in the spend data to be classified.

Accordingly, there is a need in the art for improved systems and methods of data classification pertaining to procurement spent data.

SUMMARY

An embodiment the present invention discloses a method of spend data classification. The method includes the steps of receiving a spend data from an entity at a server, cleansing the received spend data and storing the cleansed spend data in an operational database. The method further includes a check to identify if the entity is a registered entity. If the entity is identified as a registered entity then a processor selects a refresh classification tool for generating a classified data with a confidence score, else an implementation classification tool is selected. The method includes the step of creating a training classification model from the selected classification tool by using an artificial intelligence engine. The classification model is then stored in a training model database. The cleansed spend data is fetched from the operation database and any unknown terms in the cleansed spend data is identified by using a web mining tool. The processor selects the web mining tool to determine information about the unknown terms. The information is included in the cleansed spend data to obtain enriched spend data. The enriched spend data is used to create a classification data matrix by using the processor. The classification model stored in the training model database is applied to the classification data matrix for classifying the spend data and provide the confidence score of the classified spend data.

In an embodiment of the invention, a web mining tool is used for obtaining unknown terms in received spend data. The method of obtaining unknown terms includes inserting the unknown terms in a search engine API (application program interface), extracting a predefined quantity of URLs (Uniform Resource Locators) from results of the search engine, crawling the extracted URLs for obtaining web content, parsing the web content to obtain a plurality of texts relating to the unknown terms, identifying most frequent text relevant to the unknown terms from the obtained texts through a text mining engine, and appending the identified text to the cleansed received data.

In an embodiment, the present invention provides a system for spend data classification. The system includes a server configured to receive spend data from an entity. The server includes at least one data store having a plurality of databases including an operational database for storing the received spend data after cleansing. The server further includes a verification engine for checking if the entity is a registered entity and a processor configured to select a classification tool amongst a refresh classification tool or implementation classification tool for generating a classified data with a confidence score. The refresh classification tool is selected if the entity is a registered entity else the implementation classification tool is selected. The server includes an AI (artificial intelligence) engine for creating a training classification model from the selected classification tool and a training model database for storing the training classification model. The system includes a data manager configured to fetch the cleansed spend data from the operational database and identify any unknown terms in the cleansed spend data, and a web memory module for storing a web mining tool wherein the processor selects the web mining tool for determining information about the unknown terms in the cleansed spend data to obtain enriched spend data. The AI engine of the system is configured to create a data matrix from the enriched spend data where the stored training classification model is applied to the classification data matrix for classifying the spend data and provide the confidence score of the classified spend data.

In an embodiment, the present invention provides a computer program product for spend data enrichment and classification using multiple integrated tools configured to generate classified data with confidence score. The product includes a computer readable storage medium readable by a processor and storing instructions for execution by the processor for performing the method of spend data classification.

In an embodiment of the present invention, the step of obtaining classified data and the confidence score of the classified data includes obtaining a category code for each of the naive base, SVM (support vector machine) and LR (Logistic vector algorithm) models from the classification data matrix. Then it is checked if each of the category codes are the same, if yes, then obtaining confidence score of the classified data. If the category codes are different, then a preferred model and its corresponding category code are checked by fetching information from a preferred model and category code database, and the fetched preferred model and its corresponding category code are fetched as the preferred category code and the selected preferred category code is applied for obtaining confidence score of the classified data.

In an advantageous aspect, the present invention utilizes Machine Learning algorithms and advanced text matching algorithm in the pre-classified data to determine 'Statistical models' which helps in categorization of new and un-categorized spend data.

Advantageously, the refresh classification tool of the present invention enables a process where an engine utilizes historically classified spend data from the same registered entity to find, extract and remember patterns and words distributions from the historical data. Similarly, the implementation classification of the present invention enables a process where the entity is new and there is no reference data available. This brings new challenges on how to build a reference set / training set from available classified data from other registered entities. In an advantageous aspect, the present invention provides an intelligent and unique approach to classify spend data from new entity by leveraging information from other entity and web if required.

BRIEF DESCRIPTION OF THE DRAWINGS

The disclosure will be better understood and when consideration is given to the drawings and the detailed description which follows. Such description makes reference to the annexed drawings wherein:

FIG. 3A-3G are examples of spend data classification in accordance with an embodiment of the invention;

FIG. 4A-4D are examples showing confidence score generated for the classified data in accordance with an embodiment of the invention.

DETAILED DESCRIPTION

Figure 1:
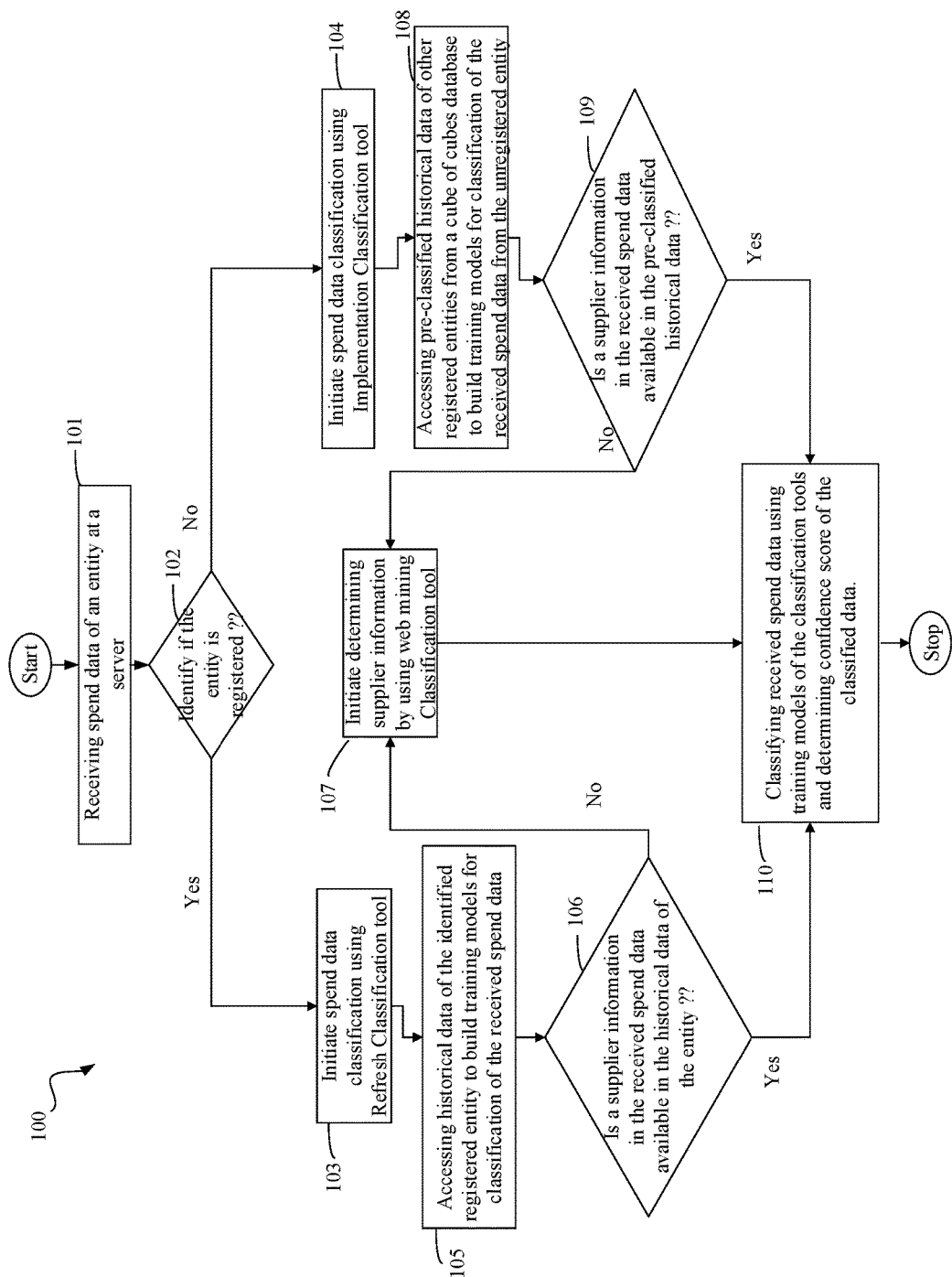
FIG. 1 is a flowchart depicting a method of spend data classification in accordance with an embodiment of the invention.

Described herein are the various embodiments of the present invention, which includes a method and a system of spend data classification using an artificial intelligence engine configured to integrate a refresh classification tool or an implementation classification tool with a web mining tool.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "spend data," "supplier description," or "transactions," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for spend data classification with multiple integrated tools configured for generating classified data with confidence score while working on many applications including but not limited to procurement application.

Referring to FIG. 1, a flowchart 100 depicting a method of spend data classification is provided in accordance with an embodiment of the present invention. The method includes the step 101 of receiving spend data of an entity at a server. The method further includes the step 102 of identifying if the entity is a registered entity. If the entity is a registered entity then a step 103 of initiating spend data classification using a refresh classification tool is executed, else a step 104 of initiating spend data classification using an implementation classification tool is executed. If refresh classification is initiated, then a step 105 of accessing historical data of the identified registered entity is executed to build training models for classification of the received spend data. In step 106 an operation of checking if a supplier information in the received spend data is available in the historical data of the identified registered entity is executed. If the supplier information is not available, then in step 107, a step of initiating a web mining tool to determine the information for classification is executed. If implementation classification of step 104 is initiated, then a step 108 of accessing pre-classified historical data of other registered entities from a cube of cubes database to build training models for classification of the received spend data from the unregistered entity is executed. In step 109 a check to determine whether a supplier information in the received spend data is available in the pre-classified historical data of the other registered entities is executed. If the supplier information is not available, then the step 107 of initiating the web mining tool to determine the information for classification is executed. In step 110 an operation of classifying received spend data using training models of the classification tools and determining confidence score of the classified data is executed.

In an embodiment, the entity is first registered when a spend data relating to transactions for a procurement activity is received. Once the spend data is received for the first time, it is stored in a database of a procurement system and enriched as a historical data to be used for building training models later. The next time a spend data is received from the same entity, it is considered to be registered entity and classification of the newly received spend data is performed based on the historical spend data.

In an embodiment, both the refresh classification tool and the implementation classification tool includes machine learning engine (MLE) and supplier search engine (SSE) for obtaining the confidence score of the classified data.

Figure 1A:
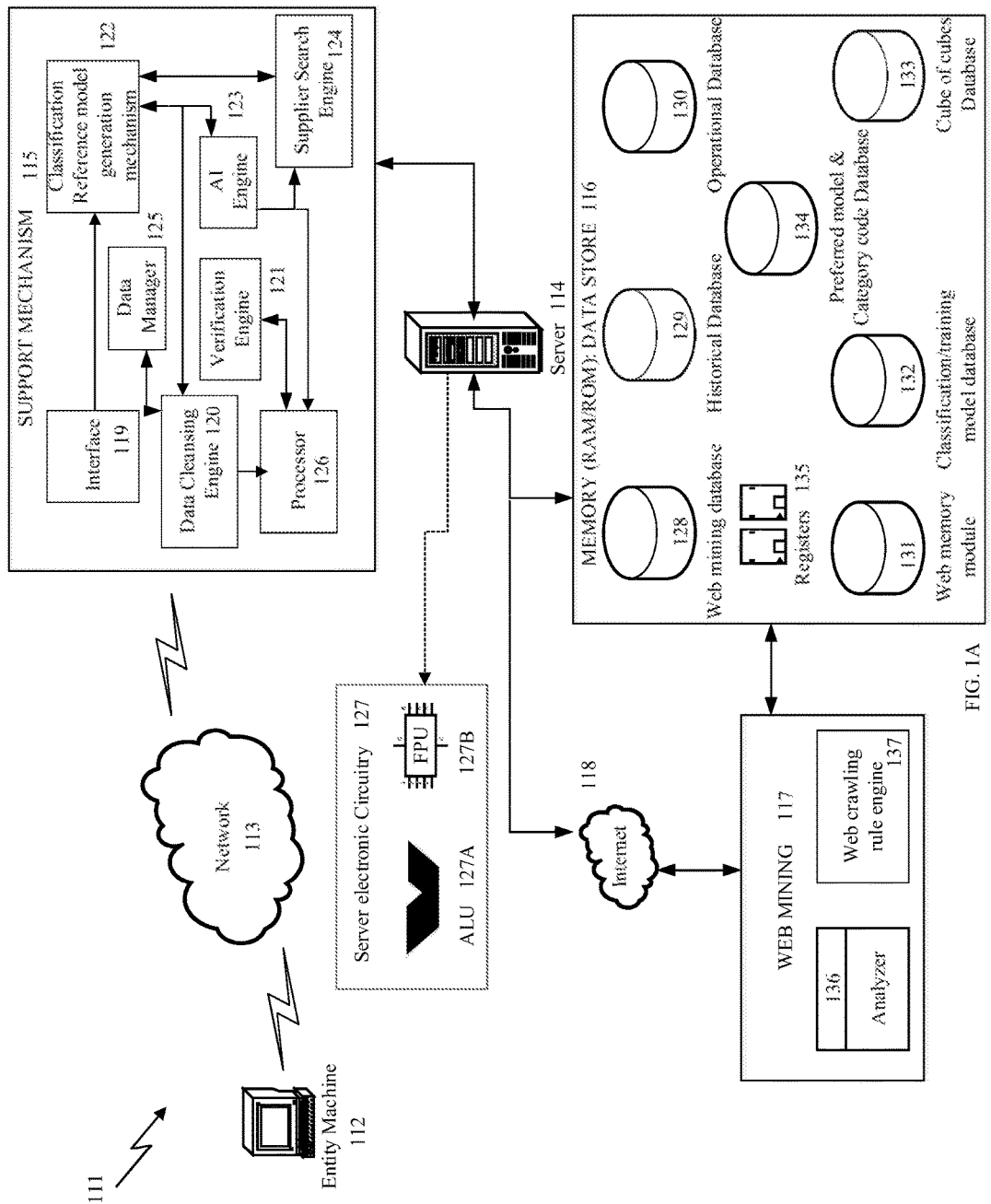
FIG. 1A is a view of a spend classification system in accordance with an embodiment of the invention.

Referring to FIG. 1A, a system 111 for spend data classification is provided in accordance with an embodiment of the present invention. The system 111 includes at least one entity machine 112 for sending spend data over a network 113. The system further includes a server 114 configured to receive the spend data from an entity. The system 111 includes a support mechanism 115 for performing spend data classification functions depending upon the type of entity i.e registered or unregistered and the type of spend data received at the server 114. The system 111 includes a memory data store 116 for accessing spend data from registered and unregistered entity and also storing plurality of training classification models created by support mechanism 115. The system includes a web mining mechanism 117 configured to access information through internet network 118 for determining unknown information of the received spend data.

In an embodiment the server 114 of the invention may include various sub-servers for communicating and processing data across the network. The sub-servers include but are not limited to content management server, application server, directory server, database server, mobile information server and real-time communication server.

In an embodiment the entity machine 112 may communicate with the server 114 wirelessly through communication interface, which may include digital signal processing circuitry. Also, the entity machine 112 may be implemented in a number of different forms, for example, as a smartphone, computer, personal digital assistant, or other similar devices.

In an example embodiment, the support mechanism 115 of the system 111 includes an interface 119 for accessing information received at the server. The support mechanism further includes a data cleansing engine 120 for normalizing spend data already available with the data store 116 of the system 111 and also cleansing of the received spend data at the server 114. The support mechanism 115 includes a verification engine 121 for verifying/identifying if the entity is a registered entity. The support mechanism 115 further includes a classification training/reference model generation mechanism 122, an AI engine 123 configured to enable classification of received spend data depending on the training models of the model generation mechanism 122, a supplier search engine 124 for determining supplier information of the received spend data, a data manager 125 for managing the received spend data by determining any unknown terms in the received spend data, and a processor 126 configured to perform various functions including, but not limited to, selecting appropriate classification tool and enabling AI engine 123 to integrate web mining tool and appropriate classification tools to classify received spend data.

In an example embodiment the server 114 may include electronic circuitry 127 for enabling execution of various steps by the processor. The electronic circuit may have various elements including but not limited to a plurality of arithmetic logic units (ALU) 127A and floating point Units (FPU) 127B, and/or the equivalents thereof. The ALU enables processing of binary integers to assist in formation of a data matrix of variables where the classification/training model is applied to the data matrix for obtaining confidence score of classified spend data. In an example embodiment the server electronic circuitry 112 as shown in FIG. 1A, includes at least one arithmetic logic unit (ALU) 127A, floating point units (FPU) 127B, other processors, memory, storage devices, high-speed interfaces connected through buses for connecting to memory and high-speed expansion ports, and a low speed interface connecting to low speed bus and storage device. Each of the components of the electronic circuitry 127, are interconnected using various busses, and may be mounted on a common motherboard or in other manners as appropriate. The processor can process instructions for execution within the server 114, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor 126 may be implemented as a chipset of chips that include separate and multiple analog and digital processors. The processor 126 may provide coordination of the other components, such as controlling user interfaces, applications run by devices, and wireless communication by devices.

The Processor 126 may communicate with a user through a control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 126, so as to enable near area communication of device with other devices. External interface may provide, for example, for wired communication in some implementations, or for wireless communication in other implementations, and multiple interfaces may also be used.

Referring to FIG. 1A, the various elements like the support mechanism 115, the memory data store 116, the web mining mechanism 117 are shown as external connections to the server 114 in accordance with an embodiment of the invention. However, it shall be apparent to a person skilled in the art that these elements may be part to an integrated server system. Also, some of the sub-elements of the support mechanism 115, the memory data store 116 and the web mining mechanism 117 either alone or in various combinations may be part of a server system as other external connections.

In an embodiment, the web mining mechanism 117 includes an analyzer 136 and a web crawling rule engine 137. The analyzer 136 is any data analyzer configured to analyze the spend data being searched by the web mining tool using the web crawling rule engine 137. The analyzer 136 is devised to analyze data on a web page and extract the data relevant to the spend data required for classification. The analyzer is configured to perform the function as per the requirement of the spend data classification system to obtain the desired result.

In an example embodiment, the memory data store 116 includes plurality of databases as shown in FIG. 1A. The data store 116 includes a web mining database 128 for storing supplier information extracted from the web, a historical database 129 for storing spend data from identified registered entity, an operational database 130 configured to store received spend data, a web memory module 131 configured to store web mining tool to determine unknown terms from the received spend data, a classification/training model database 132 configured to store a plurality of classification/training models required to classify the received data, a cube of cubes database 133 for storing pre-classified spend data received from a plurality of entities in the past, a category code database 134 configured to store information about preferred models for a particular category code, a plurality of registers 135 as part of the memory data store 116 for temporarily storing spend data from various databases to enable transfer of spend data by a processor between the databases as per the instructions of the AI engine 123 to classify spend data and obtain confidence score of the classification.

The memory data store 116 may be a volatile, a non-volatile memory or memory may also be another form of computer-readable medium, such as a magnetic or optical disk.

The memory store 116 may also include storage device capable of providing mass storage. In one implementation, the storage device may be or contain a computer-readable medium, such as a floppy disk device, a hard disk device, an optical disk device, a tape device, a flash memory or other similar solid state memory device, or an array of devices, including devices in a storage area network or other configurations.

In an embodiment, the historical database 129 includes information about an identified registered entity to enable selection of the refresh classification tool. The cube of cube database includes information about a plurality of other registered entities enabling selection of the implementation classification tool.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

Figure 2A:
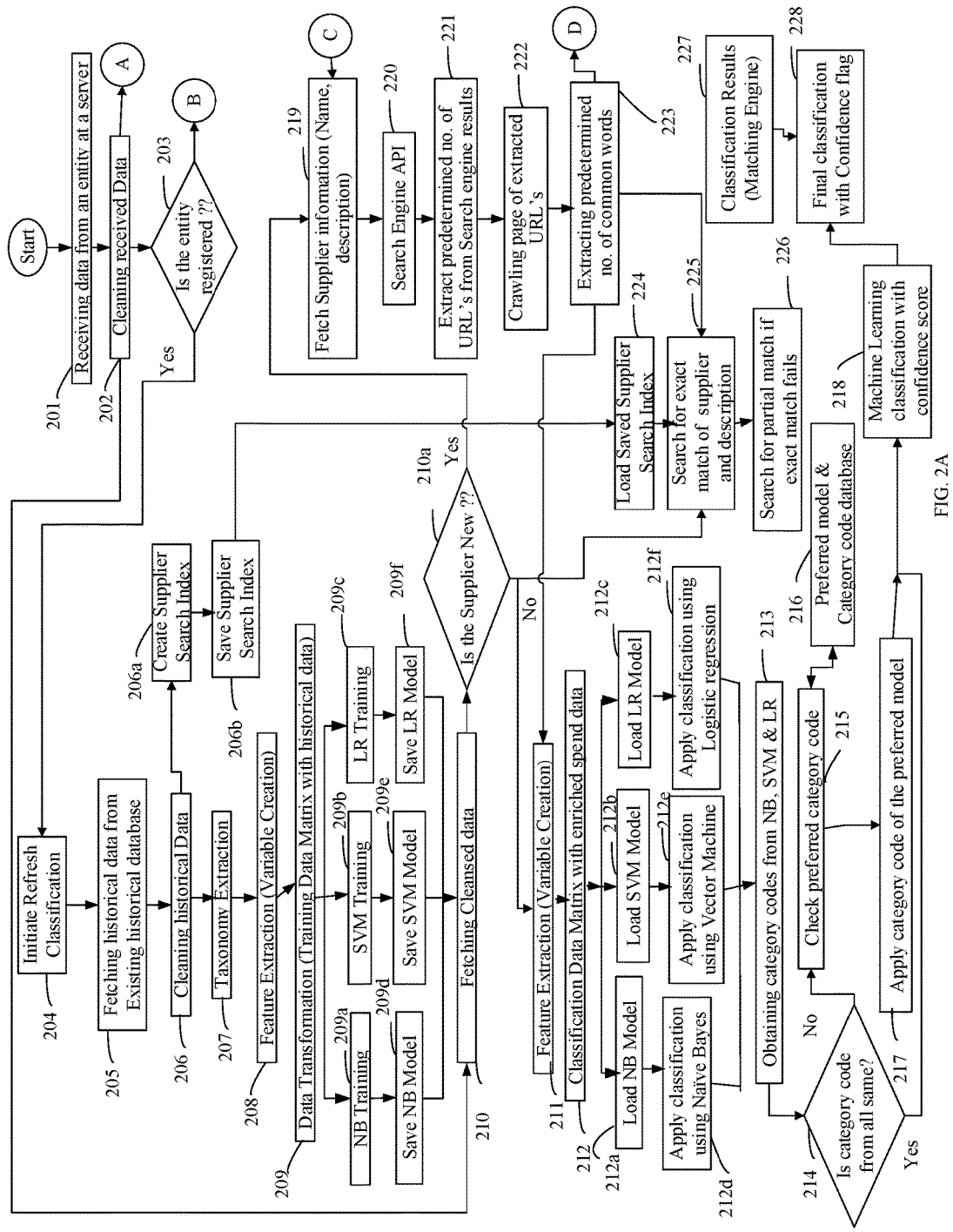
FIG. 2A-2B are flowcharts detailing the method for spend data classification using a refresh classification tool, an implementation classification tool and a web mining tool in accordance with an embodiment of the invention.

Referring to FIG. 2A, a detailed method of spend data classification using refresh classification tool and web mining tool is provided in accordance with an embodiment of the invention. The method includes the step 201 of receiving data from an entity at a server. In this method an operation of cleansing the received data 202 and an operation of checking whether the entity is a registered entity 203 is executed. If the entity is already registered, then an operation 204 of initiating refresh classification process is executed. The method further includes the operation 205 of fetching historical data of the identified registered entity from a historical database. The method further includes the operation 206 of cleansing the historical data and creating a supplier search index from the historical data 206a. The historical spend data is cleansed for obtaining normalized historical spend data. In this method an additional step 206b of saving the supplier search index may also be executed. The method further includes a step 207 of extracting taxonomy of classification based on a plurality of unique categories from the historical data. Also, in this non-limiting example embodiment, classification code vectors are obtained from training data corresponding to each of the categories of classification. This method further includes the step 208 of performing feature extraction to obtain distinct words from the spend data as variables. In step 209 spend data is transformed into a training data matrix of variables with historical data. The training classification model is created from the classification code vectors and the training data matrix by using the machine learning engine (MLE) and the AI engine. To obtain a training classification model from the historical data of the identified registered entity, reading the data matrix X and the classification code vector 'y' and the input matrix as [X y]. In step 209a a Naïve Bayes (NB) training model is obtained by applying a Naïve Bayes algorithm. In step 209b a Support Vector machine (SVM) training model is obtained by applying support vector algorithm. In step 209c a Logistic regression training model is obtained by applying Logistic vector algorithm (LR). In step 209d the NB model is saved, in step 209e the SV model is saved, and in step 209f the LR model is saved. These models are saved on computer program product to be used in classification of spend data.

In step 210 cleansed spend data is fetched and checked to determine whether supplier information in the spend data is new 210a. If the information is available in the historical database then, step 211 of performing feature extraction to obtain distinct words from the spend data as variables is performed. In step 212 the spend data is transformed into a classification data matrix of variables with received cleansed data. The classification data matrix of zeros may be created for the received cleansed data. In step 212a the NB model is loaded from the training models and obtained with historical data, in step 212b the SVM model is loaded and in step 212c the LR model is loaded. In step 212d the NB model is applied to the classification data matrix of variables for classifying the received cleansed data. In step 212e the SVM model is applied to the data matrix of variables for classifying the received cleansed data. In step 212f the LR model is applied to the classification data matrix of variables for classifying the received cleansed data. In step 213 category codes are obtained for NB, SVM and LR based models. In step 214 an operation of checking if the category codes obtained for all the three models i.e NB, SVM and LR are same is performed. If the category codes are different then, checking preferred category code in step 215 by accessing preferred category code database in step 216. The preferred category code database is a dynamically updating database that stores information about the preferred category code for the model based on the spend data. In step 217 an operation of applying category code of the preferred model to obtain machine learning classification with confidence score in step 218. If the supplier information in the spend data is new, then an operation of applying web mining tool for obtaining unknown terms in the spend data to obtain an enriched spend data is performed. In step 219 fetching unknown terms/supplier information, i.e Name, description etc., from the received cleansed spend data is performed. In step 220 the terms are applied on a search engine API. After this step, an operation 221 of extracting a pre-determined number of URL's from the search engine results is performed. In step 222 an operation of crawling a page or pages of the extracted URL's is performed as the operation 223 of extracting pre-determined number of common words. In operation 224 the saved supplier search index from the historical database is loaded and in operation 225 a search is performed for exact match for supplier information obtained from the web mining tool and the saved supplier search index. In operation 226 a partial search is performed if exact match for supplier information is not successful. In operation 227 a classification result for the supplier is obtained by the matching engine. In operation 228 a final classification of the spend data is obtained with confidence score.

In an embodiment, the web classification tool includes a text mining engine configured for taking unstructured web pages and extracting important words from them and feed them to classification engine.

In an embodiment, the web classification tool includes a web mining engine configured for utilizing the web to extract and enrich spend data and get classifications for unknown/new/ un-seen supplier in an organization.

In an embodiment the unknown term in the cleansed spend data may include supplier name, supplier description etc.

In an embodiment, the normalized historical spend data is transformed into a data matrix. The method of transforming the spend data into the matrix includes concatenating a supplier name and a description column to create one text for each transaction in the normalized historical spend data wherein number of rows in the data matrix remains same as in the normalized historical spend data, wherein each row of the data matrix corresponds to exactly one row in the normalized historical spend data and each created variable corresponds to exactly one column in the matrix, and calculating a TF*IDF score of each word present in each transaction, where TF is term frequency and IDF is inverse document frequency (IDF).

Figure 2B:
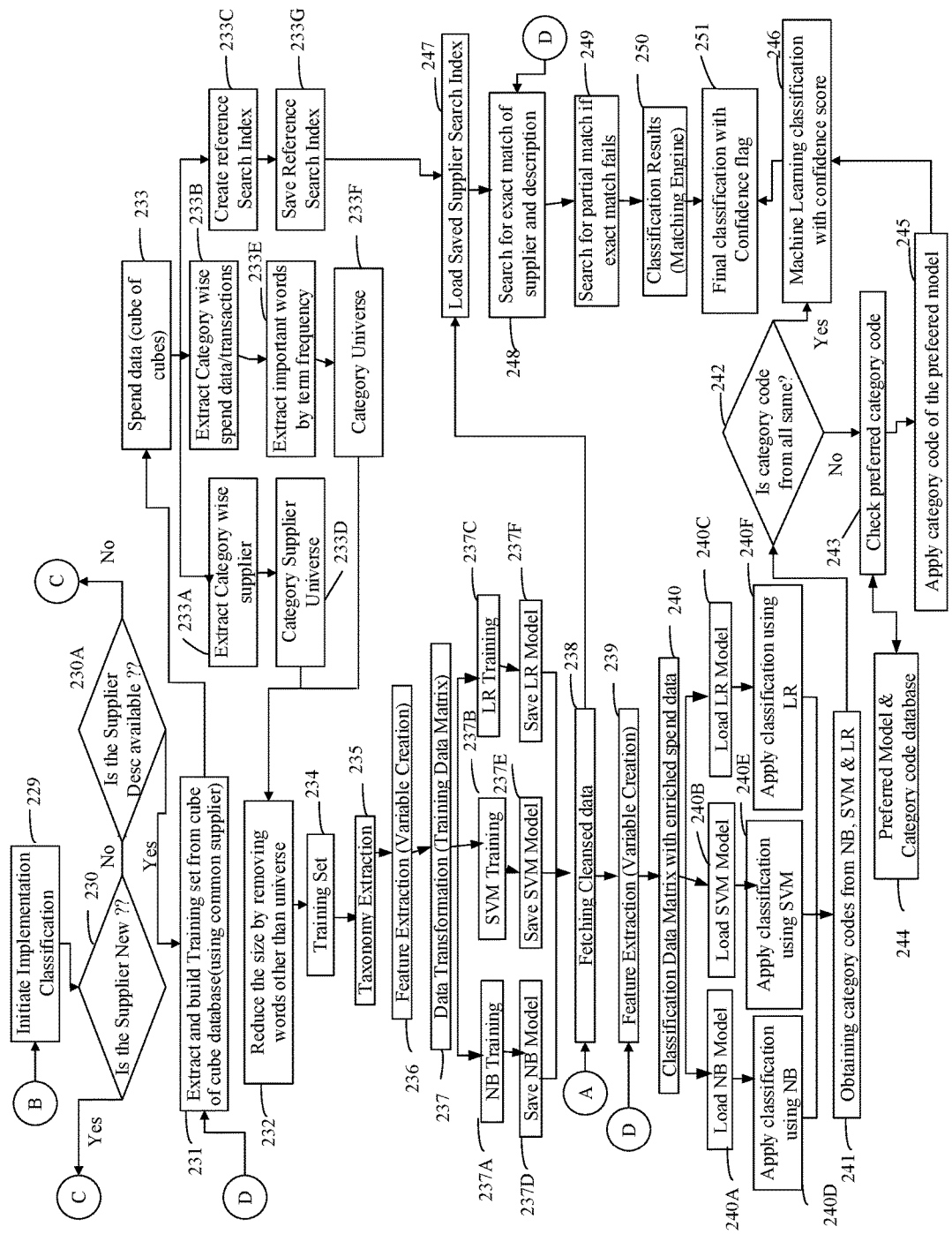

Referring to FIG. 2B, a detailed method of spend data classification using implementation classification tool and web mining tool is provided in accordance with an embodiment of the invention. The method includes the step of checking to identify if the entity is a registered entity. If the entity is not a registered, then a step of initiating implementation classification process 229 is executed. Step 230 is a checking step which checks if a supplier in the received spend data is new. Step 230A is a checking step which checks if supplier description is available in a cube of cubes database. If the supplier information is not available, then initiating web classification tool for determining the information by performing 219 to 223. In step 231 an operation of extracting and building classification/training set from cube of cube database (using common supplier) is executed. The cube of cube (COC) database is a spend data repository or a system data that stores and maintains spend data from various entities. The taxonomy associated with each entity data is converted into normalized taxonomy before storing. In step 232 an operation of reducing size of the supplier information by removing words other than the words obtained from a category universe is executed. The category universe is created by finding out from description of the spend data, the words that define/represent the category. The creation of category universe includes retrieving all transactions for each category from COC, identifying important words for each category by removing noise words form description, applying word mining technique (tf, idf, etc) on the remaining description words and selecting top N number of words from the list. These N words represent the Category word universe. In other words, the category universe is obtained by extracting common supplier data or spend data from other registered entity by accessing cube of cube database in 233. In step 233A an operation of extracting category wise supplier data is performed. In step 233B an operation of extracting category wise spend/transaction data is performed. In step 233C an operation of creating reference supplier search index is performed. In step 233D an operation of creating category supplier universe from the supplier data is executed. In step 233E an operation of extracting important words from the spend data based on term frequency (i.e frequency of appearance of the term) is performed. In step 233F a step of forming a category universe is performed. In step 233G a step of saving the reference supplier search index is executed. In step 234 making the training set for classification of received spend data. In step 235 an operation of extracting taxonomy of classification based on unique categories from the cube of cube database of other registered entities is performed. Also, classification code vectors are obtained from training data corresponding to each of the categories of classification. In step 236 an operation of performing feature extraction to obtain distinct words from the spend data as variables is performed. In step 237 an operation of transforming the spend data into a training data matrix of variables with historical data is performed. To obtain training classification model from the cube of cube database of the other registered entity, reading the training data matrix X and the classification code vector 'y' and the input matrix as [X|y]. In step 237A an operation of obtaining Naïve Bayes (NB) training model by applying a Naïve Bayes algorithm is executed. In step 237B an operation of obtaining Support Vector machine (SVM) training model by applying Support vector algorithm is performed. In step 237C a step of obtaining Logistic regression training model by applying Logistic vector algorithm (LR) is performed. In step 237D an operation of saving NB model is performed. In step 237E an operation of saving SV model is performed. In step 237F an operation of saving LR model is performed. These models may be saved on computer program product to be used in classification of spend data.

In step 238 an operation of fetching cleansed spend data is performed. In step 239 an operation of performing feature extraction to obtain distinct words from the spend data as variables is performed. The supplier information obtained from the web mining tool is provided to perform the feature extraction. In step 240 an operation of transforming the spend data into a classification data matrix of variables with enriched spend data is performed. The classification data matrix of zeros is created for the enriched spend data. In step 240A an operation of loading the NB model from the training models obtained with cube of cube database is executed. In step 240B an operation of loading the SVM model is executed. In step 240C an operation of loading the LR model is executed. In step 240D an operation of applying the NB model to the classification data matrix of variables for classifying the received cleansed data is executed. In step 240E an operation of applying the SVM model to the classification data matrix of variables for classifying the received cleansed data is executed. In step 240F an operation of applying the LR model to the classification data matrix of variables for classifying the received cleansed data is executed. In step 241 category codes are obtained for NB, SVM and LR based models. In step 242 an operation of checking if the category codes obtained for all the three models i.e NB, SVM and LR are same is performed. If the category codes are different then, checking preferred category code in step 243 by accessing preferred category code database in step 244. The preferred category code database is a dynamically updating database that stores information about the preferred category code for the model based on the spend data. In steps 245 and 246 operations of applying category code of the preferred model to obtain machine learning classification with confidence score is performed. In step 247 the saved supplier search index from the cube of cube database is loaded and in step 248 a search is performed for exact match for supplier information obtained from the web mining tool and the saved supplier search index. In step 249 a partial search is performed if exact match for supplier information is not successful. In step 250 a classification result for the supplier is obtained by the matching engine. In step 251 final classification of the spend data is obtained with confidence score.

In an example embodiment of the invention, the classification of new received spend data is provided using Supplier Search Engine (SSE). The SSE uses past (pre-classified) data as a reference data and the new received spend data is used to search from the reference data for the category code. The pre-classified (reference data) is taken along with their category codes and inserted into the Data store. Here each fields of the data, like vendor name, invoice line description, material description etc., are inserted without any alteration. For each distinct word in the reference data set, an inverted index is created. This inverted index helps in quickly searching the transactions for which a particular word belongs. Each row of the new spend data is passed as a search 'query', where the query consists of the following fields: Vendor name, Line item description (either Invoice or PO) any one or more of the GL description, Material description, Material Group description etc. For each new 'query', a search function is executed which calculates a 'score' value for all of the matching document. From the 'score' values, the transaction with maximum score is picked and its category code form the reference data is return as the 'category code' for classification. Following is the way in which score function is calculated:

$$\text{Search\_score}(T) = \text{rewardFactor}(T) * \text{normalizer} * \sum_{(w)} (\text{wordScore}(w, T) * TF(w \text{ in } T) * IDF(w) * w.\text{weight}())$$

where,
a. T=document or transaction of reference data,
b. w=words/terms in the document 'T'
c. Search_score(T)='search score' of document 'T' for its search query,
d. reward Factor(T)=rewarding factor; it is used to reward transactions that contain a higher percentage of query words
e. normalizer=search query normalization factor; where normalizer=$1/\sqrt{\text{sumOfSquaredWeights}}$
and sumOfSquaredWeights is calculated by adding together the IDF of each word in the 'T', squared.
f. wordScore(w,T)=inverse square root of the number of words in the field
g. TF(w in T)=term frequency for word 'w' in document 'T',
h. IDF(w)=inverse document frequency of word 'w',
i. w.weight( )=is the boost that has been applied to the query to give weightage to any fields.

Based on maximum score value, a matching spend data is selected from the reference data and the category code of the reference data is returned as classification for the received spend data wherein the score value is the confidence value for the classification. Vendor name has the most significance in spend value, so the first search logic 'Full Search' is invoked which filters those records where the vendor name was present in the reference data. The search is then executed only in the selected subset of reference data. If the vendor name of new spend data is not present in reference data, then the second search logic 'Partial Search' is invoked which searches the current record in the entire repository of reference data. The results after executing 'Full Search' and 'Partial Search' are returned along with the confidence score.

In an embodiment, the confidence scores levels based on Machine learning (ML) algorithms, as generated by the classification tools may be High, Medium or Low. In High, all the machine learning engines with (NB) (SVM) and (LR) gives the same output. That output is the final output from the ML and SSE technique. In Medium (Med), two of the three (NB) (SVM) and (LR) machine learning algorithm gives the same output and that output is taken as the final output of the machine learning technique. In Low, all three algorithms give different output. In this case the best performing algorithm's output is taken as the final output. The best performing algorithm, as determined by the experiments, is Logistic Regression.

FIG. 3A-3G are examples of spend data classification in accordance with an embodiment of the invention.

Referring to FIG. 3A, a table 310 with an example of supplier Name with spend/transactional information and category of classification is shown. As seen, the system fetches the data for COMPANY2 from web mining tool using 'Web Mining' to complete its transaction detail by substituting it with fetched words as shown in table 320 of FIG. 3B.

Referring to table 330 of FIG. 3C, the unique categories are assigned unique category codes C1, C2, C3 etc.

The normalized supplier information with classification code vector is shown in table 340 of FIG. 3D. As seen, the Variable (words) extracted from the Normalized Data are: COMPANY1, TRAIN, FLIGHT, TICKETS, SERVICES, COMPANY2, COMPANY3, INDUSTRIAL, SERVICES In an example embodiment, term frequency (TF) of a variable is calculated as:
TF=(Number of times a 'term/word/variable/t' occur in a transaction/row)/(Total number of words in that transaction/row); IDF: Inverse Document Frequency, which is calculated as:
IDF=Logarithm {(Total number of transactions/rows)/(Number of transactions/rows in which the variable/t of interest occurs)}.
TF measures how frequently a term appears in the data set TF(t)=(Number of times term/word/variable 't' appears in a row) / (Total number of terms in the row), and wherein TF*IDF of a term T in a row is TF(t)*IDF(t).

In the example of FIG. 3A-3D, TF for variable 'FLIGHT' for first transaction is, TF(FLIGHT)=(Number of times word 'FLIGHT' appears in first transaction)/(Total number of words in first transaction)=¼. Similarly, IDF for variable 'FLIGHT' is, IDF(FLIGHT)=log {(Total number of transactions)/(Number of transactions in which word 'FLIGHT' appears)}=log(4/3).

Referring to FIG. 3E-3G a data matrix creation is shown in accordance with an example embodiment of the invention. As seen, each transaction (textual information) is transformed into it Numerical Vector which makes up the Data Matrix. To transform a transaction each transaction into Numerical Vector, all the Variables are referred and a Numerical Score is calculated for them by using the following formula:
For each distinct 'word' in transaction 't':
  (a) Calculating 'Numerical Score (word)'=TF(word)*IDF(word)
  (b) Creating data matrix by calculating 'Numerical Score' for all the words (variable) for each transaction In an example embodiment, the 'Numerical Score' for word 'FLIGHT' for first transaction is: $(1/4)*\log(4/3) = 0.25*0.28768 = 0.07192$ The TF value in the above example is shown in table 350 of FIG. 3E. The IDF value for all variables is as shown in table 360 of FIG. 3F. The data Matrix 370 for the example of Numerical Score is as shown in FIG. 3G.

Figures 4C, 4D:
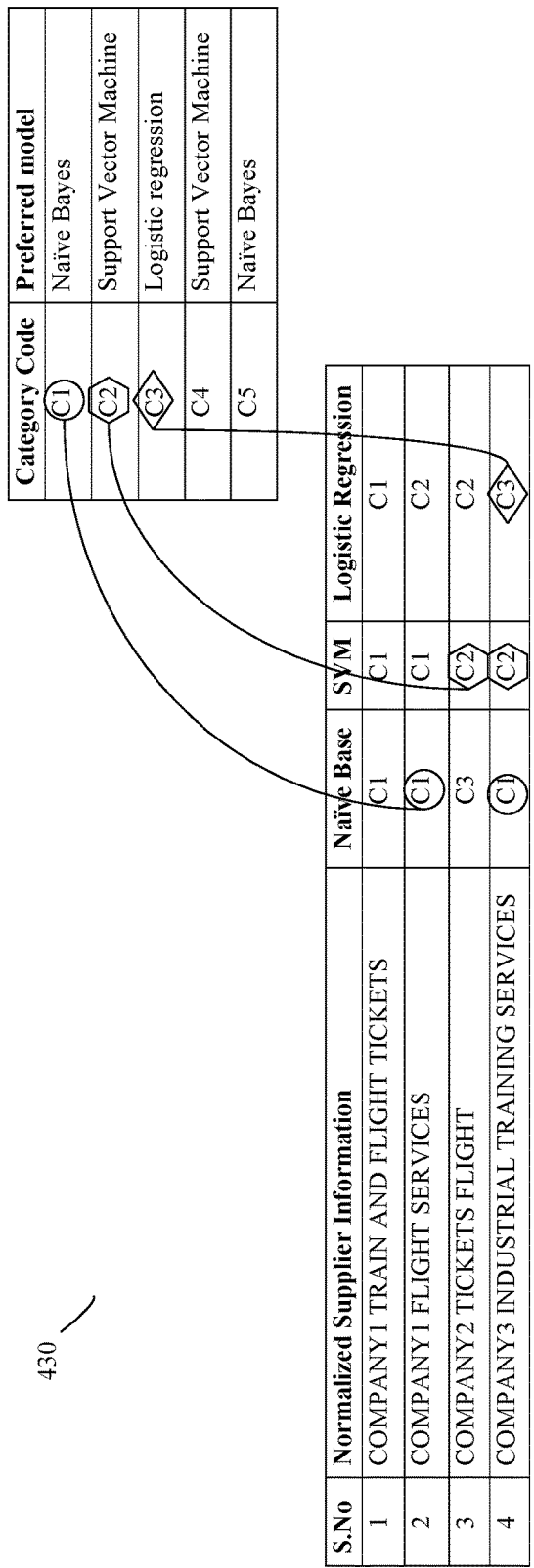

Referring to FIG. 4A-4D examples showing confidence score generation for the classified data are provided in accordance with an embodiment of the invention. In FIG. 4A, a category code and preferred data model for the category code is provided in table 410. The preferred models are stored in the preferred model and category code database 134, providing information about the preferred model for a spend data to be classified. After classifying received spend data from all the three Models i.e NB, SVM and LR, three category codes (corresponding to all three models) is received for each of the transactions in the received spend data as shown in table 420 of FIG. 4B.

In an embodiment all three models/algorithm can give similar output or completely varying outputs depending on the performance of the algorithm for the predicted category. The preferred matrix/table 410 is loaded from the preferred category code database 134.

The present invention utilizes the category code and preferred model mapping to generate confidence score along with the final classification for a transaction. Also the scoring algorithms utilizes the preference of models, calculated during the training phase, to get the classification & confidence in case of conflict.

Referring to FIG. 4C, method for obtaining final classification and confidence score is illustrated. As shown in FIG. 4C, the preferred model and category code matching is performed in the table 430. In first transaction, all three algorithms are giving the same output, so any of the three is taken as the final classification and the confidence score based on the category weight/preferred model assigned is "High". In transactions 2 and 3, the preferred model/category weight are NB and SVM respectively, and also one more of the remaining two algorithms give the same output, thereby, making the confidence score as "Medium". In fourth transaction, all the three algorithms are disagreeing on the output code although they are preferred for their specific category. Then the algorithm checks whether for the preference of algorithm from the reference/preferred model and category code database 134 built during training phase and gives the output of that algorithm (LR) as the final output based on the category weight/preferred model. The final classification with confidence score based on the preferred model is shown as table 440 in FIG. 4D. The preferred model for a category raises the category weight for the classified spend data to be a preferred model in case the category code obtained as an output after applying the models to the spend data matches with the preferred model and its category code.

In an embodiment spend data has generally Vendor Name, Invoice line description, purchase order description, material description, general ledger account information and spend values. These are the fields based upon which a spend analyst classifies a transaction into one of the pre-defined category. The categories (a.k.a. taxonomy) are decided in advanced. The vendor name is, however, very loosely related to taxonomy of classification and similarly the transaction description fields are also very less informative on their own to classify a transaction into a specific taxonomy. The problem becomes more tedious when the number of taxonomies is huge.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/ computing device or as a separate product.

The computer readable storage medium can retain and store instructions for use by an instruction execution device i.e it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of spend data enrichment and classification, the method comprising the steps of:
 receiving a spend data from an entity at a server;
 cleansing the received spend data and storing the cleansed spend data in an operational database;
 checking to identify if the entity is a registered entity;

selecting by a processor a classification tool amongst a refresh classification tool or implementation classification tool for generating a classified data with a confidence score wherein the refresh classification tool is selected if the entity is identified registered entity else the implementation classification tool is selected;

creating by an artificial intelligence engine a training classification model from the selected classification tool and storing the model in a training model database;

fetching the cleansed spend data from the operational database and identifying any unknown terms in the cleansed spend data;

selecting by the processor a web mining tool configured to determine information about the identified unknown terms in the cleansed spend data to obtain an enriched spend data;

creating a classification data matrix from the enriched spend data, and applying the stored training classification model to the classification data matrix for classifying the spend data and provide the confidence score of the classified spend data;

wherein classification of received spend data includes the steps of:

passing each word of the received spend data as a search query to a search engine; and calculating a score for each search query as:

$$\text{Search\_score}(T) = \text{rewardFactor}(T) * \text{normalizer} * \sum_{(w)} (\text{wordScore}(w, T) * TF(w \text{ in } T) * IDF(w) * w.\text{weight}())$$

where,
a. rewardFactor(T)=rewarding factor; it is used to reward transactions that contain a higher percentage of query words;
b. normalizer=search query normalization factor;
c. wordScore(w,T)=inverse square root of a number of words in the field
d. TF (w in T)=term frequency for word 'w' in document 'T',
e. IDF(w)=inverse document frequency of word 'w',
f. w.weight( )=is the boost that has been applied to the query to give weightage to any fields
wherein based on maximum score value, a matching spend data is selected from a reference data and a category code of the reference data is returned as classification for the received spend data wherein the score value is the confidence value for the classification.

2. The method as claimed in claim 1 wherein the selected classification tool includes machine learning engine (MLE) and supplier search engine (SSE) for obtaining the confidence score of the classified data.

3. The method as claimed in claim 2 wherein the step of creating the training classification model with the refresh classification tool as the selected classification tool further includes the steps of:

retrieving a historical spend data from a historical database of the registered entity;

cleansing the historical spend data for obtaining normalized historical spend data;

extracting a plurality of categories from the normalized historical spend data for creating taxonomy of classification;

fetching a plurality of classification code vectors from the normalized historical spend data wherein the code vectors correspond to each of the extracted categories of the classification;

extracting a plurality of distinct words from the normalized historical spend data to create a list of variables;

transforming normalized historical spend data into a training data matrix using the list of variables, and creating the training classification model from the classification code vectors and the training data matrix by using the machine learning engine (MLE) and the AI engine.

4. The method as claimed in claims 3 wherein the step of creating the training classification models further includes:

reading the training data matrix and the plurality of classification code vector;

applying Naïve Bayes (NB) algorithm to train a Bayes model for the normalized historical spend data by using machine learning engine (MLE);

applying Support Vector Machine (SVM) algorithm to obtain SVM models by using machine learning engine (MLE);

applying Logistic Regression (LR) algorithms to obtain LR models by using machine learning engine (MLE), and saving NB, SVM and LR models as the training classification models for classification in the training model database.

5. The method as claimed in claim 4 wherein the step of transforming normalized historical spend data into a training data matrix includes:

concatenating a supplier name and a description column to create one text for each transaction in the normalized historical spend data wherein number of rows in the data matrix remains same as in the normalized historical spend data, wherein each row of the training data matrix corresponds to exactly one row in the normalized historical spend data and each created variable corresponds to exactly one column in the matrix;

calculating a TF*IDF score of each word present in each transaction.

6. The method as claimed in claim 5 wherein
TF is Term Frequency of a variable, which measures how frequently a term appears in the data set TF(t)=(Number of times term/word/variable 't' appears in a row)/(Total number of terms in the row), and
IDF is Inverse Document Frequency, which measures how important each term is IDF(t)=log_e (Total number of rows/Number of rows with term t in it),
wherein TF*IDF of a term 't' in a row is TF(t)*IDF(t).

7. The method as claimed in claim 6 further comprising the steps of:

fetching the cleansed received spend data from the operational database;

checking if a supplier mentioned in the fetched spend data is existing wherein if the supplier is a new supplier then using the web mining tool unknown terms of the supplier are determined else, if the supplier is existing then supplier related data is fetched from the historical database;

fetching extracted variables and creating a classification data matrix of zeros for the fetched cleansed data;

computing the TF*IDF score for each column of the classification data matrix, and applying the training classification model to the classification data matrix for obtaining classified data and the confidence scores of the classified data.

8. The method as claimed in claim 7 wherein the step of obtaining classified data and the confidence score of the classified data includes:
obtaining a category code for each of the naïve base, SVM and LR models from the classification data matrix;
checking if each of the category codes are same, if yes then obtaining confidence score of the classified data else,
checking for a preferred model and its corresponding category code by fetching information from a preferred model and category code database, and
selecting the fetched preferred model and its corresponding category code as the preferred category code and applying the selected preferred category code for obtaining confidence score of the classified data.

9. The method as claimed in claim 2 wherein classification of received data by using the supplier search classification engine includes the steps of:
extracting pre-classified spend data as the reference data from a historical database or a cube of cube database;
searching in the reference data for the category code for the received spend data;
fetching the reference data along with their category code and storing in a supplier data repository; and
passing each word of the received spend data as a search query to the search engine for calculating the search score for each search query;
where,
T=document or transaction of reference data,
w=words/terms in the document 'T'
Search_score (T)='search score' of document 'T' for its search query,
normalizer=$1/\sqrt{sumOfSquaredWeights}$
and sumOfSquaredWeights is calculated by adding together the IDF of each word in the 'T', squared.

10. The method as claimed in claim 1 wherein the historical database includes information about the identified registered entity enabling selection of the refresh classification tool.

11. The method as claimed in claim 9 further comprising the step of creating an inverted index for each distinct word in the reference data wherein the inverted index enables quick search.

12. The method as claimed in claim 9 wherein the search query includes search fields like vendor name, line item description, General Ledger (GL) description, material description and material group description.

13. The method as claimed in claim 11 wherein the search engine performs a full search and a partial search on the reference data.

14. A method of spend data enrichment and classification, the method comprising the steps of:
receiving a spend data from an entity at a server;
cleansing the received spend data and storing the cleansed spend data operational database;
checking to identify if the entity is a registered entity;
selecting by a processor a classification tool amongst a refresh classification tool or implementation classification tool for generating a classified data with a confidence score wherein the refresh classification too is selected if the entity is identified registered entity else the implementation classification tool is selected;
creating by an artificial intelligence engine a training classification model from the selected classification tool and storing the model in a training model database wherein creating the training classification model from implementation classification tool includes:
fetching a plurality of classification code vectors from a normalized system data;
extracting a plurality of distinct words from the normalized system data to create a list of variables;
transforming normalized historical spend data into a training data matrix using the list of variables, and
creating the training classification model from the classification code vectors and the training data matrix using the machine learning engine (MLE) and the AI engine;
fetching the cleansed spend data from the operational database and identifying any unknown terms in the cleansed spend data;
selecting by the processor a web mining tool configured to determine information about the identified unknown terms in the cleansed spend data to obtain an enriched spend data;
creating a classification data matrix from the enriched spend data, and
applying the stored training classification model to the classification data matrix for classifying the spend data and provide the confidence score of the classified spend data.

15. The method as claimed in claim 14, wherein the cube of cube database includes information about a plurality of other registered entities not including the identified registered entities thereby enabling selection of the implementation classification tool.

16. The method as claimed in claim 14 wherein the step of extracting the system data includes the steps of:
extracting category wise supplier's information from the cube of cubes spend database to form a category supplier universe;
extracting category wise spend data information from the cube of cubes spend database;
fetching a set of important words from the extracted spend data information based on term frequency to form a category universe, and
removing words other than the category universe.

17. The method as claimed in claim 14 wherein the step of creating the training classification models further includes:
reading the training data matrix and the plurality of classification code vector;
applying Naïve Bayes (NB) algorithm to train a Bayes model for the normalized historical spend data by using machine learning engine;
applying Support Vector Machine (SVM) algorithm to obtain SVM models by using machine learning engine;
applying Logistic Regression (LR) algorithms to obtain LR models by using machine learning engine, and
saving NB, SVM and LR models as the training classification models for classification.

18. The method as claimed in claim 14 further comprising the steps of:
fetching the cleansed received data from the operational database;
checking if a supplier mentioned in the fetched data is existing wherein if the supplier is a new supplier then using the web mining tool unknown terms of the supplier are determined else, if the supplier is existing then supplier related data is fetched from the cube of cube database;
fetching the list of variables and creating a classification data matrix of zeros for the fetched cleansed data;
computing a TF*IDF score for each column of the classification data matrix, and applying the training classification model to the classification data matrix of zeros for obtaining classified data and the confidence scores of the classified data.

19. The method as claimed in claim 18 wherein the step of obtaining classified data and the confidence score of the classified data includes:
obtaining a category code for each of the naïve base, SVM and LR models from the classification data matrix;
checking if each of the category codes are same, if yes then obtaining confidence score of the classified data else,
checking for a preferred model and its corresponding category code by fetching information about a preferred model from a preferred model and category code database;
selecting the fetched preferred model and its corresponding category code as the preferred, category code and applying the selected preferred category code for obtaining confidence score of the classified data.

20. The method of spend data classification as claimed in claim 1 wherein the step of selecting the web mining tool for obtaining unknown terms further includes the step of:
inserting the unknown terms at a search engine API;
extracting a predefined quantity of URLs from results of the search engine;
crawling the extracted URLs for obtaining web content based on a web crawling rule engine;
parsing by an analyzer the web content to obtain a plurality of texts relating to the unknown terms;
identifying most frequent text relevant to the unknown terms from the obtained texts through a text mining engine, and
appending the identified text to the cleansed spend data for obtaining enriched spend data.

21. A system for spend data enrichment and classification comprising:
a server configured for receiving a spend data from an entity, the server includes:
at least one data store having a plurality of databases including an operational database for storing the received spend data after cleansing;
a verification engine for checking if the entity is a registered entity;
a processor configured for selecting a classification tool amongst a refresh classification tool or implementation classification tool for generating a classified data with a confidence score wherein the refresh classification tool is selected if the entity is a registered entity else the implementation classification tool is selected;
an AI engine for creating a training classification model from the selected classification tool wherein for creating the training classification model from implementation classification tool the AI engine is configured for:
fetching a plurality of classification code vectors from a normalized system data;
extracting a plurality of distinct words from the normalized system data to create a list of variables;
transforming normalized historical spend data into a training data matrix using the list of variables, and
creating the training classification model from the classification code vectors and the training data matrix using the machine learning engine (MLE) and the AI engine;
a training model database for storing the training classification model;
a data manager configured for fetching the cleansed spend data from the operational database and identify any unknown terms in the cleansed spend data, and
a web memory module for storing a web mining tool wherein the processor selects the web mining tool for determining information about the identified unknown terms in the cleansed spend data to obtain an enriched spend data,
wherein the AI engine is configured for creating a data matrix from the enriched spend data wherein the stored training classification model is applied to the classification data matrix for classifying the spend data and provide the confidence score of the classified spend data.

22. The system as claimed in claim 21 further comprising at least one ALU for processing binary integers to assist in formation of a data matrix of variables wherein the training classification model is applied to the data matrix for obtaining confidence score of classified spend data.

23. The system as claimed in claim 21 wherein the training models include NB model, SVM model and LR model.

24. The system as claimed in claim 23 further comprising a preferred model and category code database storing information about preferred model and its corresponding category code for determining the preferred model for obtaining spend data classification and confidence score in case output of all three models NB, SVM and LR are same.

25. A computer program product for spend data enrichment and classification, the product comprising:
a computer readable storage medium readable by a processor and storing instructions for execution by the processor for performing a method, the method comprising:
receiving a spend data from an entity at a server;
cleansing the received spend data and storing the cleansed spend data in an operational database;
checking to identify if the entity is a registered entity;
selecting by a processor a classification tool amongst a refresh classification tool or implementation classification tool for generating a classified data with a confidence score wherein the refresh classification tool is selected if the entity is identified registered entity else the implementation classification tool is selected;
creating by an artificial intelligence engine a training classification model from the selected classification tool and storing the model in a training model database;
fetching the cleansed spend data from the operational database and identifying any unknown terms in the cleansed spend data;
selecting by the processor a web mining tool configured to determine information about the identified unknown terms in the cleansed spend data to obtain an enriched spend data;
creating a classification data matrix from the enriched spend data, and
applying the stored training classification model to the classification data matrix for classifying the spend data and provide the confidence score of the classified spend data wherein classification of received spend data includes:
passing each word of the received spend data is a search query to a search engine;
calculating a score for each search query as:

$$\text{Search\_score}(T) = \text{rewardFactor}(T) * \text{normalizer} * \sum_{(w)} (\text{wordScore}(w, T) * TF(w \text{ in } T) * IDF(w) * w.\text{weight}())$$

where,
a. rewardFactor(T)=rewarding factor; it is used to reward transactions that contain a higher percentage of query words;
b. normalizer=search query normalization factor;
c. wordScore(w,T)=inverse square root of a number of words in the field
d. TF (w in T)=term frequency for word 'w' in document 'T',
e. IDF(w)=inverse document frequency of word 'w',
f. w.weight( )=is the boost that has been applied to the query to give weightage to any fields
wherein based maximum score value, a matching spend data is selected from a reference data and a category code of the reference data is returned as classification for the received spend data wherein the score value is the confidence value for the classification.

26. The method as claimed in claim 14 wherein the step of creating the training classification model with the implementation classification tool as the selected classification tool further includes the steps of:
appending information about unknown terms in the cleansed spend data to the system data wherein the information is determined by using the web mining tool;
extracting the system data from a cube of cubes spend database;
cleansing the system data for obtaining normalized system data; and
extracting a plurality of categories from the normalized system data for creating taxonomy of classification wherein the code vectors correspond to each of the extracted categories of the classification.

27. A computer program product for spend data enrichment and classification, the product comprising:
a computer readable storage medium readable by a processor and storing instructions for execution by the processor for performing a method, the method comprising:
receiving a spend data from an entity at a server;
cleansing the received spend data and storing the cleansed spend data in an operational database;
checking to identify if the entity is a registered entity;
selecting by a processor a classification tool amongst a refresh classification tool or implementation classification tool for generating a classified data with a confidence score wherein the refresh classification tool is selected if the entity is identified registered entity else the implementation classification tool is selected;
creating by an artificial intelligence engine a training classification model from the selected classification tool and storing the model in a training model database wherein creating the training classification model from implementation classification tool includes:
fetching a plurality of classification code vectors from a normalized system data;
extracting a plurality of distinct words from the normalized system data to create a list of variables;
transforming normalized historical spend data into a training data matrix using the list of variables, and
creating the training classification model from the classification code vectors and the training data matrix using the machine learning engine (MLE) and the AI engine;
fetching the cleansed spend data from the operational database and identifying any unknown terms in the cleansed spend data;
selecting by the processor a web mining tool configured to determine information about the identified unknown terms in the cleansed spend data to obtain an enriched spend data;
creating a classification data matrix from the enriched spend data, and
applying the stored training classification model to the classification data matrix for classifying the spend data and provide the confidence score of the classified spend data.

28. A system for spend data enrichment and classification comprising:
a server configured for receiving a spend data from an entity, the server includes:
at least one data store having a plurality of databases including an operational database for storing the received spend data after cleansing;
a verification engine for checking if the entity is a registered entity;
a processor configured for selecting a classification tool amongst a refresh classification tool or implementation classification tool for generating a classified data with a confidence score wherein the refresh classification tool is selected if the entity is a registered entity else the implementation classification tool is selected;
an AI engine for creating a training classification model from the selected classification tool;
a training model database for storing the training classification model;
a data manager configured for fetching the cleansed spend data from the operational database and identify any unknown terms in the cleansed spend data, and
a web memory module for storing a web mining tool wherein the processor selects the web mining tool for determining information about the identified unknown terms in the cleansed spend data to obtain an enriched spend data,
wherein the AI engine is configured for creating a data matrix from the enriched spend data wherein the stored training classification model is applied to the classification data matrix for classifying the spend data and provide the confidence score of the classified spend data
wherein a search engine classifies the received spend data by:
passing each word of the received spend data as a search query to the search engine;

calculating a score for each search query as:

$$\text{Search\_score}(T) = \text{rewardFactor}(T) * \text{normalizer} * \sum_{(w)} (\text{wordScore}(w, T) * TF(w \text{ in } T) * IDF(w) * w.\text{weight}())$$

where,
a. rewardFactor(T)=rewarding factor; it is used to reward transactions that contain a higher percentage of query words
b. normalizer=search query normalization factor;
c. wordScore(w,T)=inverse square root of a number of words in the field
d. TF(w in T)=term frequency for word 'w' in document 'T',
e. IDF(w)=inverse document frequency of word 'w',
f. w. weight( )=is the boost that has been applied to the query to give weightage to any fields
wherein based on maximum score value, a matching spend data is selected from a reference data and a category code of the reference data is returned as classification for the received spend data wherein the score value is the confidence value for the classification.

* * * * *